United States Patent Office.

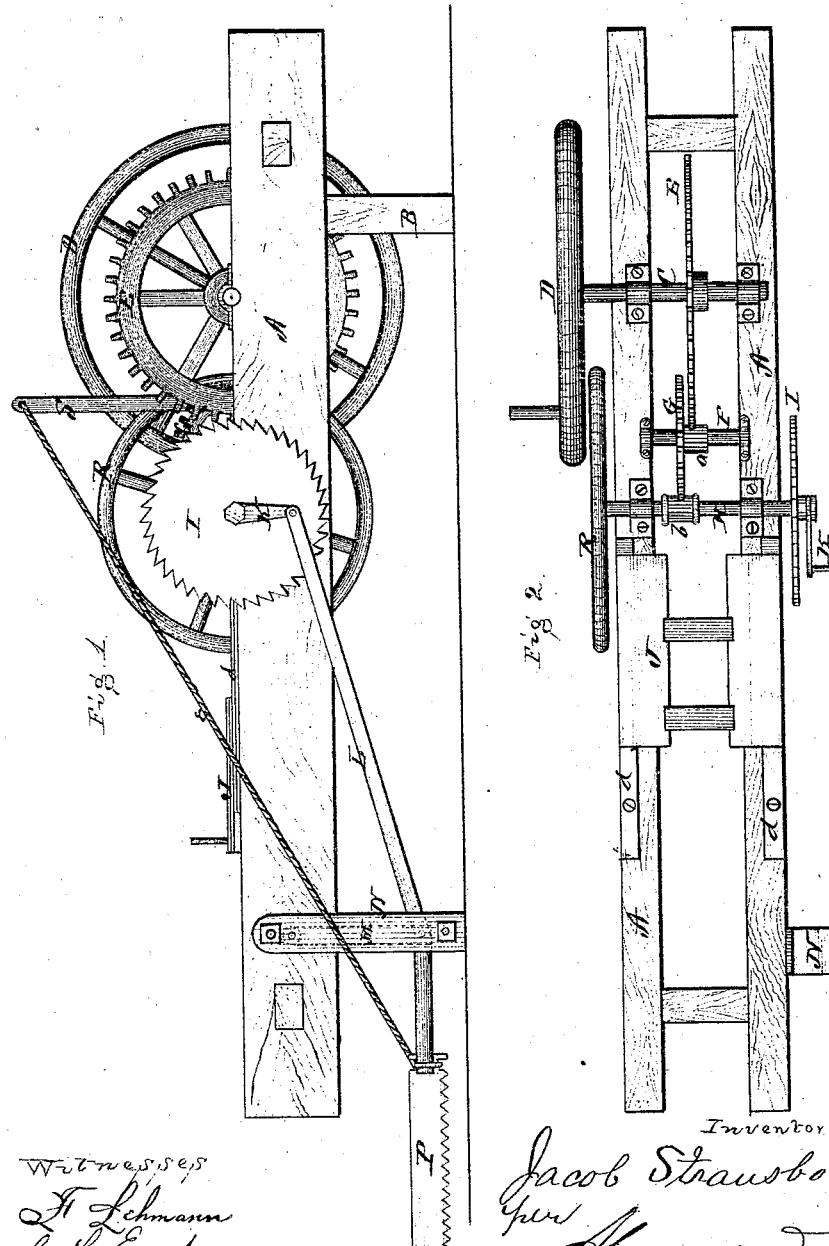

JACOB STRAUSBAUGH, JR., OF TIFFIN, OHIO.

Letters Patent No. 104,077, dated June 7, 1870.

IMPROVEMENT IN SAWING-MACHINE.

The Schedule referred to in these Letters Patent and making part of the same.

To all whom it may concern:

Be it known that I, JACOB STRAUSBAUGH, Jr., of Tiffin, in the county of Seneca and in the State of Ohio, have invented certain new and useful Improvements in Portable Hand and Power Sawing-Machine; and do hereby declare that the following is a full, clear, and exact description thereof, reference being had to the accompanying drawing and to the letters of reference marked thereon making a part of this specification.

The nature of my invention consists in the construction and arrangement of a "portable hand-power sawing-machine," in which both circular and cross-cut saws may be used.

In order to enable others skilled in the art to which my invention appertains to make and use the same, I will now proceed to describe its construction and operation, referring to the annexed drawing, in which—

Figure 1 is a side view, and

Figure 2 a plan view of my machine.

A represents the frame of my machine, which is supported a suitable distance above the ground upon legs B B.

Across the frame A, near one end, is placed the main driving-shaft C, having at one end the crank-wheel D.

Upon the shaft C, within the frame A, is placed the cog-wheel E, which gears with a pinion, $a$, upon another shaft, F, having, also, its bearings on the frame A.

This latter shaft, F, is also provided with a cog-wheel, G, which meshes with the pinion $b$ upon the circular-saw shaft H, upon the end of which, close to the outer side of the frame A, the circular saw I is secured.

By this arrangement of cog-wheels and pinions, I obtain a very rapid rotary motion of the saw I, with small power applied to the crank-wheel D.

Upon the frame A is placed the track $d$, for the carriage J to move upon and feed the lumber to the saw I.

To operate a cross-cut saw with the same machine, I attach a crank, K, to the end of the saw-shaft H, and this crank is, by a pitman, L, connected with a swinging bar, M, shown in dotted lines in fig. 1.

The normal position of the bar M is perpendicular, it being pivoted at its upper end within a box or frame, N, attached to the side of the frame A. The pitman L is pivoted to the lower end of the bar M, so that said bar, by the motion of the crank K, obtains a pendulum or swinging motion.

To the lower end of the said bar M is also pivoted the handle of the cross-cut saw P, which thus obtains the necessary reciprocating motion.

If desired, I attach a fly or crank-wheel, R, to the end of shaft H, by the use of which the saw P may be operated so as not to give it such rapid motion as would be the case if operated by the crank-wheel D.

The saw P is, by a rope, $e$, connected with a post, S, secured in the frame A, so that the operator, stationed at the driving or crank-wheel, can raise the saw P up and allow the log to pass under it.

Having thus fully described my invention,

What I claim as new, and desire to secure by Letters Patent, is—

The arrangement of the shafts C F H, cog-wheels B G, crank and fly-wheels D R, pinions $a$ $b$, saw I, crank K, pitman L, pendulum M, saw P, cord $e$, and post S, all substantially as shown and described.

In testimony that I claim the foregoing, I have hereunto set my hand this 1st day of November, 1869.

JACOB STRAUSBAUGH, JUNIOR.

Witnesses:
 JAS. B. MILLER,
 WM. M. JOHNSON.